(12) United States Patent
Ramasamy et al.

(10) Patent No.: US 10,348,346 B2
(45) Date of Patent: Jul. 9, 2019

(54) SYSTEM AND METHOD FOR OPERATING A UNIFIED ANTENNA FRONT END MODULE

(71) Applicant: Dell Products, LP, Round Rock, TX (US)

(72) Inventors: Suresh Ramasamy, Austin, TX (US); Youngsoo Cho, Cedar Park, TX (US); Ricardo R. Velasco, Cumming, GA (US); Ching Wei Chang, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/624,518

(22) Filed: Jun. 15, 2017

(65) Prior Publication Data

US 2018/0367177 A1  Dec. 20, 2018

(51) Int. Cl.
 *H04B 1/04*  (2006.01)
 *H04B 15/00* (2006.01)
 *H04B 17/10* (2015.01)
 *H04B 1/12*  (2006.01)
 *H04B 1/18*  (2006.01)

(52) U.S. Cl.
 CPC ............... *H04B 1/126* (2013.01); *H04B 1/18* (2013.01)

(58) Field of Classification Search
 CPC .......... H04B 1/10; H04B 1/04; H04B 1/0475; H04B 1/0483; H04B 1/18; H04B 15/00; H04B 17/10; H04B 17/29
 See application file for complete search history.

(56) References Cited

U.S. PATENT DOCUMENTS

| 8,204,446 | B2 | 6/2012 | Scheer | |
|---|---|---|---|---|
| 8,325,097 | B2 | 12/2012 | McKinzie, III | |
| 8,442,019 | B2 * | 5/2013 | Trott | H04B 1/715 370/342 |
| 8,618,990 | B2 | 12/2013 | Somero | |
| 8,688,056 | B2 * | 4/2014 | Chen | H04B 1/406 455/79 |
| 8,830,934 | B2 * | 9/2014 | Banister | H04B 1/0475 370/329 |

(Continued)

*Primary Examiner* — Blane J Jackson
(74) *Attorney, Agent, or Firm* — Prol Intellectual Property Law, PLLC; H. Kenneth Prol

(57) ABSTRACT

A wireless adapter front end system and method for an information handling system including a wireless adapter for communicating on a plurality antenna systems for connection to a plurality of concurrently operating wireless links with a controller executing code instructions for an antenna optimization system for detecting one or more active wireless links operating via the plurality of antenna systems where the controller receives a trigger input indicating an operating condition to determine whether an antenna adjustment is required among the plurality of antenna systems, wherein the trigger input may be selected from one or more indications of a shared communication frequency band, a radio aggregation operation, SAR proximity detection, or operation of a plurality of radio access technologies (RATs). The controller implementing an impedance adjustment of at least one of the plurality of wireless antenna systems to avoid interference between concurrently operating wireless links.

20 Claims, 5 Drawing Sheets

(56) References Cited

U.S. PATENT DOCUMENTS

| | | | |
|---|---|---|---|
| 8,897,181 B2* | 11/2014 | Wang | H04W 72/1215 |
| | | | 370/282 |
| 9,301,177 B2 | 3/2016 | Ballantyne | |
| 9,306,613 B2 | 4/2016 | Black | |
| 9,451,630 B2* | 9/2016 | Chen | H04W 72/1215 |
| 9,510,303 B2* | 11/2016 | Chen | H04W 52/04 |
| 2008/0192806 A1* | 8/2008 | Wyper | H04W 88/06 |
| | | | 375/133 |
| 2010/0098135 A1* | 4/2010 | Eitan | H04B 1/109 |
| | | | 375/141 |
| 2010/0304770 A1* | 12/2010 | Wietfeldt | H04W 72/1215 |
| | | | 455/509 |
| 2010/0323636 A1 | 12/2010 | Cowley | |
| 2011/0090982 A1* | 4/2011 | Chen | H04B 1/406 |
| | | | 375/285 |
| 2011/0244812 A1 | 10/2011 | Cowley | |
| 2012/0178386 A1* | 7/2012 | Pascolini | H04B 1/525 |
| | | | 455/84 |
| 2016/0126992 A1* | 5/2016 | Hu | H04B 15/06 |
| | | | 455/296 |
| 2016/0174293 A1* | 6/2016 | Mow | H04B 17/102 |
| | | | 455/426.1 |

\* cited by examiner

SYSTEM AND METHOD FOR OPERATING A UNIFIED ANTENNA FRONT END MODULE

FIELD OF THE DISCLOSURE

The present disclosure generally relates to a method and apparatus for a unified RF front end solution for a plurality of radio antenna systems used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front end antenna module and other radio frequency subsystems. Users may choose from among several available radiofrequency communication platforms in information handling systems for data and other communications with other users via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
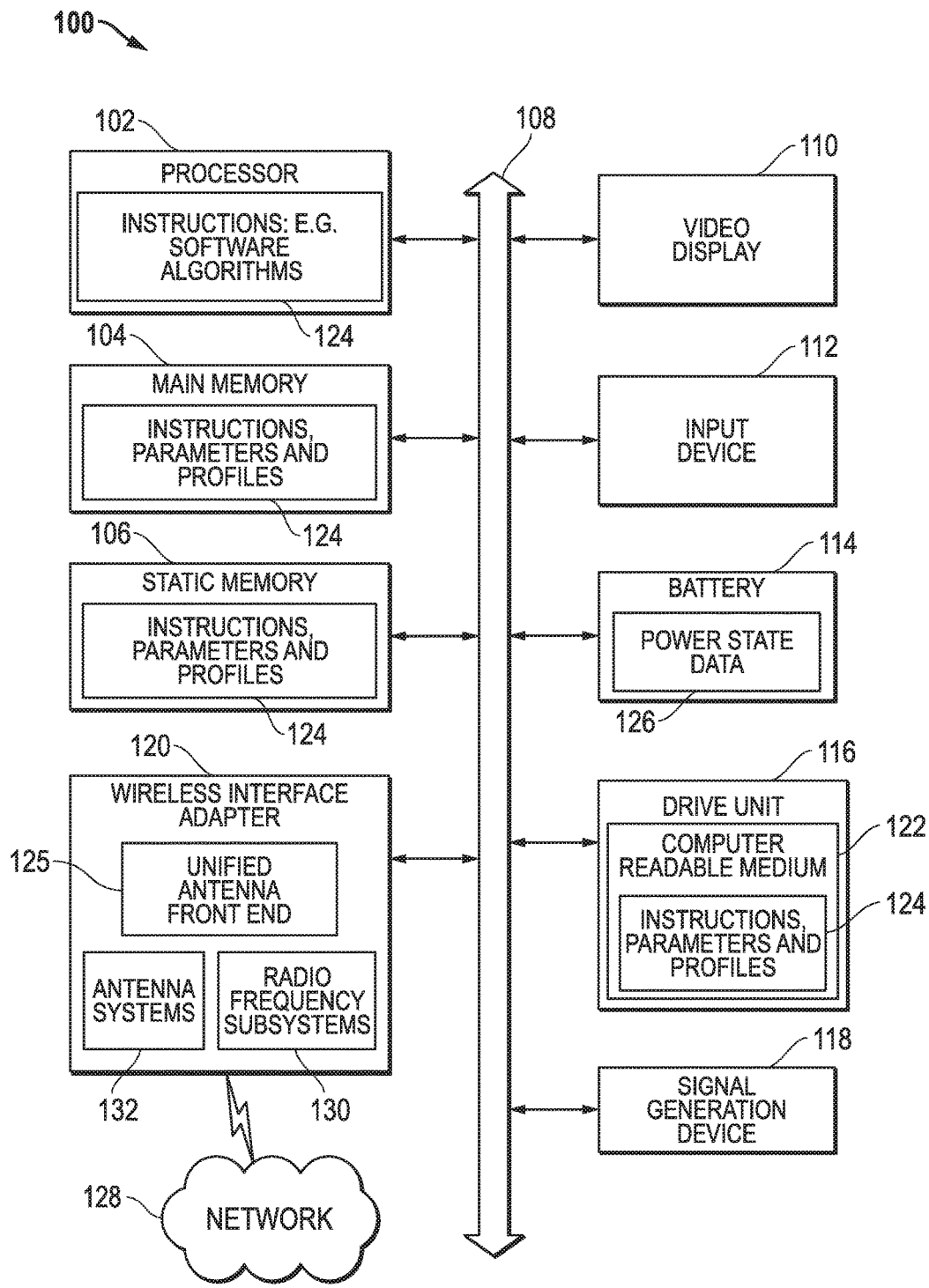
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna system to transmit wirelessly. Portions of an information handling system may themselves be considered information handling systems.

FIG. 1 shows an information handling system 100 capable of administering each of the specific embodiments of the present disclosure. The information handling system 100 can represent the mobile information handling systems 210, 220, and 230 or servers or systems located anywhere within network 200 of FIG. 2, including the remote data centers operating virtual machine applications. Information handling system 100 may represent a mobile information handling system associated with a user or recipient of intended wireless communication. A mobile information handling system may execute instructions via a processor for an antenna optimization system including concurrent wireless link utilization according to embodiments disclosed herein. The application programs communicating or otherwise operating via concurrently wireless links may operate in some example embodiments as software, in whole or in part, on a mobile information handling system while other portions of the software applications may operate on remote server systems. The antenna optimization system of the presently disclosed embodiments may operate as firmware, software, or hardwired circuitry or any combination on controllers or processors within the information handing system 100 or some of its components such as a wireless interface adapter 120. Information handling system 100 may also represent a networked server or other system and administer aspects of the antenna optimization system via instructions executed on a processor according to various embodiments herein involving remote operation of such systems. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may software applications which utilize one or more wireless links for wireless communications via the wireless interface adapter as well as other aspects or components. Similarly instructions 124 may be executed as antenna optimization system disclosed herein for monitoring wireless links and adjusting wireless antenna systems and resources although in some aspects the antenna optimization system may operate as firmware on a controller within the wireless interface device 120. Instructions 124 may also include aspects of the antenna optimization system as part of a unified antenna front end 125 described in the present disclosure and operating as firmware or software to remedy or adjust one or more of a plurality of antenna systems 132 via selecting wireless link communication frequency band channels. However, multiple antenna systems operating on various communication frequency bands may yield interference due to nearness of transmission or reception due to nearness of frequency channels or due to physical proximity of the antenna systems among other factors. In other aspects instructions 124 may execute algorithms to regulate operation of the one or more antenna systems 132 in the information handling system 100 to avoid poor wireless link performance due to potential effects of interference from nearby antenna operation, both physically and in frequency of wireless link channels used.

Various software modules comprising software application instructions 124 or firmware instructions may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct monitoring and processing of mobile information handling system usage trends by the information handling system 100 according to the systems and methods disclosed herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the antenna optimization system algorithms or antenna adjustment policies described in embodiments herein may be stored here or transmitted to local memory located with the unified antenna front end 125 in the wireless interface adapter 132.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the concurrent wireless link optimization system or the antenna optimization system may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 132 which may be tunable antenna systems for use with the system and methods disclosed herein. Additional antenna system modification circuitry (not shown) may also be included with the wireless interface adapter 120 to implement coexistence control measures as described in various embodiments of the present disclosure.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments according to the antenna optimization system of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication pursuant to operation of an antenna optimization system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
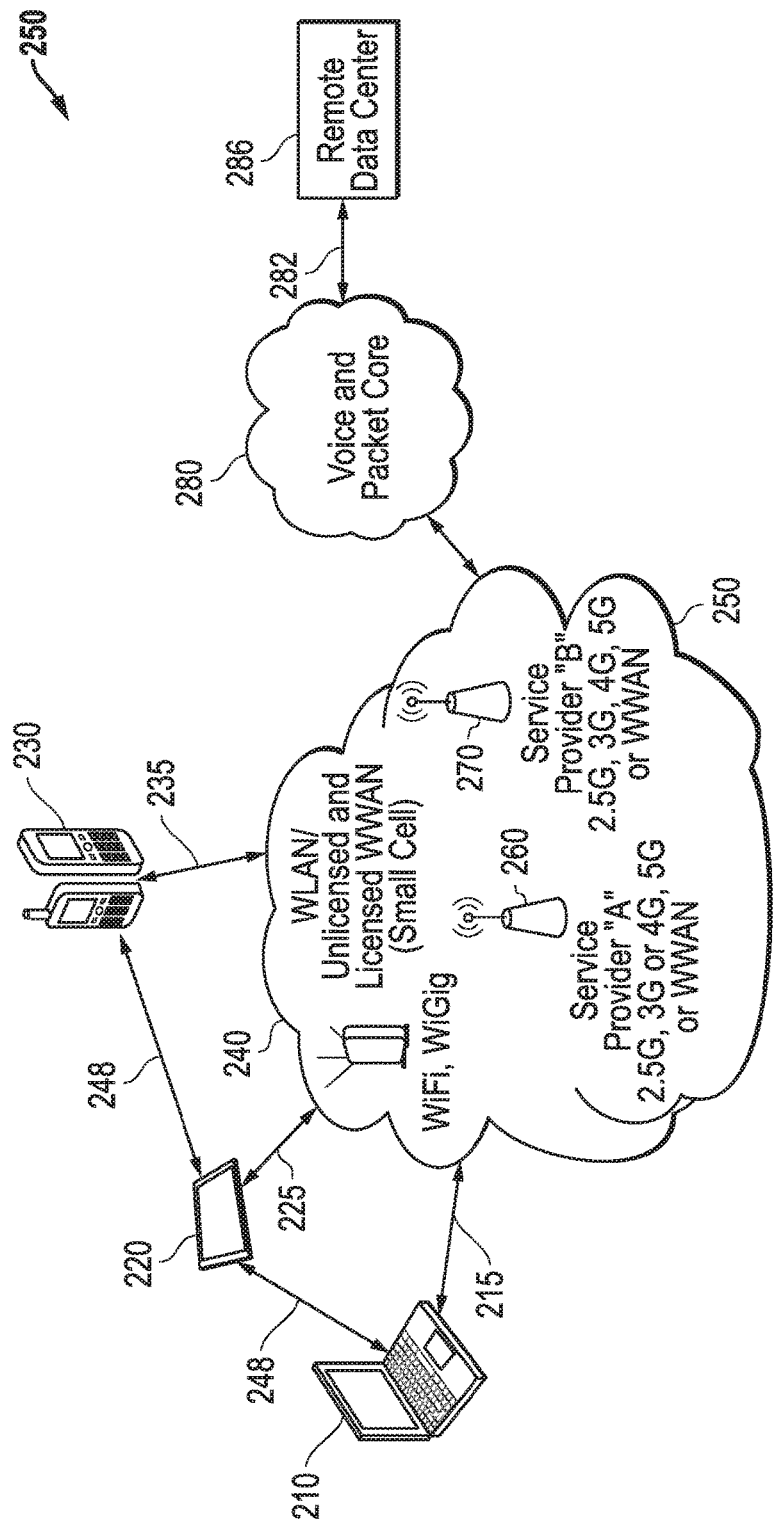
FIG. 2 is a block diagram of a network environment offering several communication protocol options and mobile information handling systems according to an embodiment of the present disclosure.

FIG. 2 illustrates a network 200 that can include one or more information handling systems. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. Such issues may be addressed or mitigated with remedies according to the antenna optimization system of the unified RF front end 125 according to embodiments herein.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

In an example embodiment, the cloud or remote data center or networked server may run hosted applications for systems 210, 220, and 230. For example, remote data center, networked server, or some combination of both may operate some or all of an antenna optimization system including a storing and providing antenna adjustment policy to models of information handling system 100 or updates of the same as disclosed in the present disclosure. The cloud or remote data center or networked server may run hosted applications for systems 210, 220, and 230 by establishing a virtual machine application executing software to manage applications hosted at the remote data center in an example embodiment. Mobile information handling systems 210, 220, and 230 are adapted to run one or more applications locally, and to have hosted applications run in association with the local applications at remote data center or networked servers. For example, mobile information handling systems 210, 220, and 230 may operate some or all of the antenna optimization system or software applications utilizing the wireless links, including a concurrent wireless links, in some embodiments. The virtual machine application may serve one or more applications to each of mobile information handling system 210, 220, and 230. Thus, as illustrated, systems 210, 220, and 230 may be running applications locally while requesting data objects related to those applications from the remote data center via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. The web browser application may request web data from a host application that represents a hosted website and associated applications running at a remote data center.

Although 215, 225, and 235 are shown connecting wireless adapters of mobile information handling systems 210, 220, and 230 to wireless networks 240 or 250, wireless communication may link through a wireless access point (Wi-Fi or WiGig), through unlicensed WWAN small cell base stations such as in network 240 or though a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as a access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
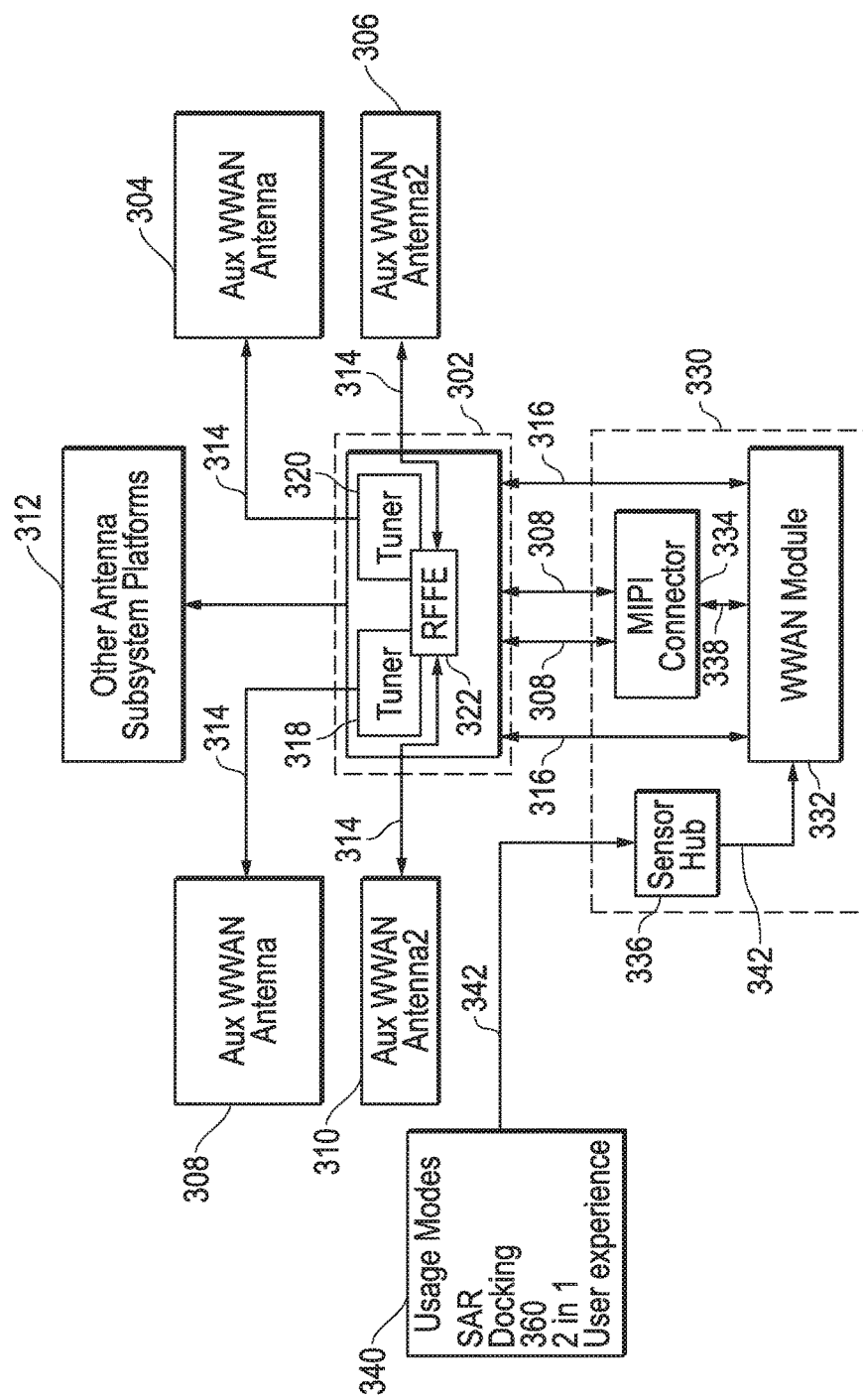
FIG. 3 block diagram illustrating a wireless interface adapter with a radio frequency front end module for an example set of plurality of wireless antennas available to an information handling system according to an embodiment of the present disclosure.

FIG. 3 illustrates a RF front end 302 for one or more antenna systems that may operate on an information handling system in an example embodiment. In an example aspect, the RF front end 302 may be unified in that it may be implementable in a variety of models of information handling systems to avoid the need for customized RF integrated circuits to be designed for each model information handling system produced by a manufacturer according to embodiments herein. The RF front end 302 further accommodates a variety of models and configurations or orientations of those models of information handling systems by providing for adjustment as configuration, orientation, or user interface with the information handling system changes. In embodiments, the RF front end 302 may accommodate the model type into which it is installed and may also dynamically accommodate ongoing orientation, user proximity, or other usage of the information handling system that may impact the antenna operation. Further, antenna mounting location and utilization of auxiliary transmission/reception surfaces such as information handling system chassis or case components may vary between model types. Thus, a unified RF front end 302 may accommodate the differences in antenna locations as well as other trigger factors to avoid interference among concurrently operating antennas.

In yet another aspect, RF front end 302 also may mitigate interference or accommodate SAR safety requirements due to several antenna systems operating concurrently on the information handling system. Concurrent antenna operation may be within the same RAT such as plural cellular connections or with MIMO or other aggregation connectivity through plural antennas on the information handling system. Concurrent antenna operation may be across a variety of available RATs and may further accommodate aggregation of multiple parallel data streams across RATs in some embodiments as such technology becomes more available.

As described further below, RF front end 302 may receive a plurality of trigger inputs and access an antenna adjustment policy stored for antenna element control parameters to execute modifications to the antenna operation. The antenna adjustment policy may be particular to a model type of an information handling system in an aspect. One or more of several antenna adjustment options are available to the RF front end 302 in some embodiments. The RF front end 302 may implicate antenna adjustment to accommodate the received trigger inputs such as for orientation changes, modification of SAR requirement due to proximity or other usage factors, frequency bands or determined concurrent antenna operation among other trigger inputs as described in various embodiments herein.

The RF front end 302 may include a RF front end controller 322 that may include access to a local memory (not shown). The RF front end controller 322 may also interface with one or more tuners 318 and 320. The frequency front end module 302 may interface with a plurality of antenna systems 304, 306, 308, and 310 directly or via a tuner system. In FIG. 3, a plurality of WWAN antenna systems are shown such as for cellular connectivity to wireless links. It is understood that antenna systems 304, 306, 308 and 310 in the presently shown example embodiment may be differing services available through WWAN including small cell licensed WWAN connections or subscriber cellular connectivity such as through LTE or other WWAN protocols. Further, it is understood that although antenna systems 304, 306, 308 and 310 are shown as a plurality of WWAN antennas, the RF front end 302 may also be used to interface with a plurality of antennas such as WLAN antennas or WPAN antennas. For example, a plurality of Wi-Fi antennas may be mounted and operational on the information handling system model in which RF front end 302 is installed.

In some aspects, unified RF front end 302 may interface and control a plurality of antennas across several RAT types including cellular, Wi-Fi, and Bluetooth to name a few. The unified RF front end 302 and controller 322 thereon may execute machine readable code instructions of an antenna optimization system for control of the plurality of antennas associated with a wireless interface device or connected in coordination of the same according to embodiments of the present disclosure. For example, in another aspect RF front end 302 may interface with other the wireless antenna subsystem platforms 312. Coordination with those other antenna subsystem platforms 312 may be to varying degrees but may be coordinate the antenna adjustments made dynamically in some embodiments in response to one or more trigger inputs to the RF front end 302 among any of a plurality of antenna systems.

Antenna systems 304, 306, 308 and 310 may be connected to RF front end 302 via connections 314 which may include antenna connection ports in some embodiments. The ports for a plurality of antenna systems concurrently operating may experience port-to-port cross current coupling. This port coupling among the antenna systems 304, 306, 308 and 310 may generate unwanted interference or degradation of performance. Antenna systems 304, 306, 308 and 310 may be a variety of antenna systems that are mounted within the information handling system or may utilize peripheral antenna systems connected to RF front end 302. In some example embodiments, antenna systems 304, 306, 308 and 310 may utilize an antenna device installed on an information handling system. In other embodiments, antenna systems 304, 306, 308 and 310 may also incorporate RF radiator surfaces such as portions of the information handling system chassis, motherboard, wiring/traces, or case components as aspects of the antenna systems 304, 306, 308 and 310. Some of these RF radiation effects may not be intentional. In yet other example embodiments, antenna systems 304, 306, 308 and 310 may utilize auxiliary devices such as cords or cabling external to the information handling system.

RF front end 302 may be connected to a plurality of system motherboard components of a wireless interface device for a mobile information handling system. For example, I2C lines such as 316 may be connected between the RF front end 302 and a WWAN module or other protocol module such as WLAN or Bluetooth modules for control via the protocol. In a further aspect, a Mobile Industry Processor Interface (MIPI) connector 334 may be connected via one or more MIPI lines 308 to RF front end 302 in an embodiment. The MIPI connector 334 may in turn be connected to a protocol module 332 via 338 and may be used to forward instructions, policy details, or other data or commands to the RF front end 302 according to embodiments of the present disclosure. It is understood that the I2C lines or MIPI lines may be used for various aspects of the embodiments disclosed herein including for transfer of data, trigger inputs, policy, or commands from the protocol module 332 or other subsystems of the wireless interface device adapter to the RF front end 302.

Sensor hub 336 may receive sensor data that serves as all or part of some of the trigger inputs described. For example the motherboard 330 with wireless interface adapter having a WWAN module 332 may receive data from the sensor system module 336 that includes an accumulator sensor hub 336. The accumulator sensor hub 336 gathers sets of data from some or all of a variety of orientation sensors, proximity sensors, docking sensors or the like as shown for use with usage modes 340. Sensor hub 336 may be located within wireless interface adapter or elsewhere on motherboard 330 of the information handling system. Orientation sensor types include motion sensors and other sensors with some orientation sensors connected through the sensor hub or accumulator device and system. Orientation sensors may include one or more digital gyroscopes, accelerometers, and magnetometers. Motion sensors may also include reference point sensors. For example, a geomagnetic field sensor may determine position of a display screen relative to a keyboard of a laptop or a 360 degree convertible device. This positional information may provide x-axis, y-axis, and z-axis positional information of the information handling system relative to magnetic north pole, and there for a reference point of the device position. In one embodiment, two geomagnetic field sensors provide x-axis, y-axis, and z-axis positional information for each display screen of the dual display information handling system. With this data, the system determines the relative position of the two display screens to one another in orientation.

Also, a digital gyro and accelerometer may be used to detect motion and changes in position. These sensors may provide a matrix of data. In an example embodiment, the azimuth or yaw, pitch, and roll values of the device are indicated by the raw sensor data. The orientation data may be relevant to relative locations of antennas with an information handling system such as those located in different hinged portions in one embodiment. In connection with a reference point, such magnetic north as provided in one embodiment by a geomagnetic field sensor, the azimuth can be determined as a degree of rotation around a z-axis. Further hinge azimuth angle may be discussed further below. In an embodiment, the azimuth may be the value of the z-axis relative to the device y-axis as positive angle values between 0° and 360°. It is understood that a different range of values may be assigned in different embodiments of a laptop, 360 degree convertible device, or even a tablet computing system which may have a plurality of display screens.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead. Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The orientation sensor data may be processed partly by a sensor hub 336 or accumulator to provide orientation data for the information handling system. The sensor hub performs a fusion of data signals received from either a single sensor or multiple sensor devices. In one example embodiment, the sensor hub is an independent microcontroller such as the STMicro Sensor Fusion MCU.

The sensor data may further include proximity sensors or capacitive touch sensors. For example, touch or hover sensors may detect when a screen is actively being used. Further, proximity sensors, for example capacitive sensors, may detect the location of a user relative to various parts of the information handling system and antennas located nearby. Proximity sensors on one or more display screens or a keyboard may detect the position of a user body part such as a hand, lap, arm, torso or the like) around information handling system (for example, directly in front, above, below, to the right, or to the left of the plane of the display screen or the keyboard) and thus determine required SAR levels based on the position of the user or users.

Another sensor state of usage activity sensor is a Hall Effect sensor that may detect when a magnet, of certain polarity and strength, is in proximity to the sensor. It is used to detect the closed position of a device with two sides. For example, a Hall Effect sensor may determine when two hinged display screens or a screen and keyboard are closed onto one another so that a magnet in one screen triggers a Hall Effect sensor in the second screen. Alternatively, a different Hall Effect sensor may determine if the hinged display screens are open to an orientation of 360° so that the back sides of the display screens are in proximity such that a magnet located with one display screen triggers the Hall Effect sensor of the other.

Hall Effect magnets and magnetic sensors may be deployed as a type of orientation or state sensor for usage mode trigger inputs 340. It is known in the art that a relative angle between a magnetic field source of known polarity and strength may be determined by strength and change to a magnetization vector detected by magneto-resistive detectors of a Hall Effect sensor. Thus, motion and relative angle may also be detected by the Hall Effect sensors. The Hall Effect sensor may also detect when a laptop of 360 degree convertible computer, also referred to as a 2 in 1 device is fully open or closed.

Other detectors are also contemplated include a docking station connection detector to detect when a mobile information handling system has been docked and is likely used in a desktop format. Additional other detectors may include a hinge angle detector that may be mechanical, electromechanical or another detecting method to determine how far the hinge between the two display screens has been opened. Such detectors are known in the art. Yet other detectors are also contemplated such as a hinge angle detector that may be mechanical, electromechanical or another detecting method to determine how far the hinge between the two display screens has been opened. Such detectors are known in the art.

Orientation of antennas relative to one another as well as relative location to a user may impact interference issues or impact the SAR safety requirements limiting transmission power levels. Further, SAR safety limitations may also be changed depending on whether a device is operating as a tablet computer, a laptop computer, or may switch between the two configurations such as a with a 360 degree convertible device. Moreover SAR safety limitations may be relaxed when an information handling system is docked in that it is then normally operating on a desktop and not likely in proximity with a user. The usage mode sensors 340, such as those described, may be connected to sensor hub 336 and further to wireless interface adapter via lines or connections 342. The usage mode sensors 340 in some embodiments may be used to determine configuration modes or usage modes of the information handling system. Data from the above sensors maybe provided to sensor hub 336 for use as trigger inputs to the RF front end 302.

RF front end 302 or wireless interface adapter on the motherboard may access trigger inputs received from sensor hub 336 and determined by the radio frequency controller such as 322 and determine one or more appropriate antenna element operation modifications, if any, based on a stored antenna adjustment policy. The antenna adjustment policy is accessed by executing code instructions for an antenna optimization system operating on the RF front end 302. The antenna adjustment policy establishes for the antenna optimization system one or more antenna element control parameters for coexistence controls. With the coexistence controls, the unified RF front end may adjust the one or more antenna systems 304, 306, 308, 310 of other antenna systems 312.

In an example embodiment, antenna optimization system of the unified RF front end may modify the concurrent operation of the plurality of antenna systems or even shared antenna systems based on established antenna adjustment policy defining antenna element control parameters for one or more antenna systems in response to one or more trigger inputs. An example antenna adjustment policy is shown below in Table 1.

TABLE 1

| Trigger Input | Antenna Element Control Parameters | | |
| --- | --- | --- | --- |
| | Enhanced notch filter isolation | Directivity | Port coupling impedance |
| Co-located SAR operation (plural TX) | | X | X |
| Capacitance/proximity | | | X |
| Wi-Fi | X | X | |
| Bluetooth | X | X | |
| Cellular | X | X | X |
| MIMO operation | X | X | X |
| Plural RAT coexistence | X | X | X |
| User configuration mode (360, tablet, laptop) | X | X | X |

The above data may be relevant to a particular information handling system model or configuration. The antenna adjustment policy may be different when a unified RF front end is utilized within different models of information handling system enabling the unified RF front end to be used in several models produced by a manufacturer. For example, the antenna adjustment policy may be custom for particular models of information handling system and tailored to antenna locations and utilization on those devices as well as orientation changes that are possible and SAR safety requirements for those particular devices. Upon being installed into and configured for a model of an information handling system, a custom antenna adjustment policy, such as Table 1 or a matrix of policies for the multiple antennas and possible configurations above may be loaded with the wireless interface adapter or with the RF front end. Accordingly, the unified RF front end eliminates the need for customized antenna front end solutions including custom radio frequency integrated circuits for each model of information handling system which often have limited functionality such as being limited to largely band switching. Further, it has been found that the custom RF integrated circuits and other components of prior solutions may incur front end losses and noise generation due to non-linearity. Previous custom antenna front end solutions had limited capability to adjust for poor antenna operating conditions, especially in light of plural concurrent wireless links operating on one or more RATs.

While Table 1 is illustrative of an antenna adjustment policy, it is understood to be an example set of data that may have additional aspects or may be different for various models of information handling systems as well as for other configurations of the same. Moreover, trigger inputs may combine to alter the antenna element control parameters such as whether there are particular wireless link protocols simultaneously operating within the same or different RATs. Thus, it is understood that Table 1 above shows only an example antenna adjustment policy which may further be only part of a matrix of tables or data of the overall the antenna adjustment policy for multiple antenna systems on the information handling system. Further details of the operation of the antenna optimization system for the unified RF front end are described in embodiments herein.

The unified RF front end may control via execution of instructions of an antenna optimization system on a RF front end controller or other controller, coexistence controls pursuant to the antenna adjustment policy and in response to detected input triggers. For example, during LTE transmitter operation at 850 MHz such as during hotspot operation, the RF front end controller could create a harmonic falling into a WiFi 2.4 GHz range of operation and desense a WiFi receiver when coupled through the WiFi antenna. In an example embodiment, previous RF integrated circuits such as a Sony SP4T switch in a signal path could generate this interference. The unified RF front end may implement an enhanced band pass filter or notch filter at the main LTE transmitter antenna to isolate one or more of a plurality of concurrently operating antenna systems from such a harmonic. The notch filter may be a network of series inductors and capacitors in parallel with a tunable impedance network which acts as an enhanced or tunable notch filter. This enhanced notch filter may be coupled in series between the switch and the LTE transmitting antenna providing the notch for the third harmonic corresponding to the state of the switch that was activated and that would fall into the 2.4 GHz WiFi band and interfere with reception.

In another example embodiment of a coexistence control implemented via the unified RF front end, impedance or capacitance tuning may be executed to adjust the ratio of impedance to capacitance for one or more antenna systems to adjust transmission directivity patterns and avoid overlap or other interference between concurrently operating antenna systems. In an example embodiment, a variable resistor or capacitor within a resistive circuit for driving and antenna may be used to alter the ratio of impedance to capacitance. For example, a WiFi 5 GHz transmitting antenna operating concurrently with a co-located LTE LAA receiver antenna may desense the LTE LAA receiver. This may occur, for example, through antenna radiated coupling paths due to antenna pattern interference caused by the antenna pattern or direction of the WiFi 5 GHz transmitter antenna system. The unified RF front end of the present embodiment may implement aperture tuning at each antenna port to alter the effective aperture length to effectively cause the transmission pattern to rotate. By using a parasitic coupling element with a variable impedance termination and which may be triggered by a switch, the system may control the directionality of the transmission signal to thereby causing a shift of transmission pattern. The unified RF front end controller may implement a controller to control this aperture tuning for the antenna ports for both the WiFi 5 GHz transmitting antenna and the co-located LTE LAA antenna to mitigate interference between them and improve RSSI.

In yet another example embodiment of coexistence control implemented via the unified RF front end, by altering or cancelling out the antenna port to port coupling between antenna ports, this may enhance rejection between ports of the plurality of antenna systems concurrently operating. For example during concurrent operation, such as a hotspot, a WiFi 5 GHz transmitting antenna operating concurrently with co-located LTE LAA receiving antenna could desense LTE LAA receiver through port to port coupling as well. A unified RF front end of the present embodiment may have a tunable decoupling network comprising a transmission line at the input of each antenna port to convert the transadmittance between ports to purely a reactance. This, followed by a tunable reactive component in shunt between the transmission lines to cancel out the reactance between the concurrent antenna ports may create an open circuit (OL) at the frequency of operation. This control may result in an improved rejection of interference between the antenna ports.

Additional coexistence control may be implemented in some embodiments by tuning for advanced open loop using feedback (AOL) or closed loop using power detection (CL) circuit. In a co-existence scenario with a plurality of concurrently operating antenna systems in transmission or reception, on antenna port termination or tuning may be altered to improve interference rejection or enhance transmission pattern diversity. In another aspect, one of the antenna port terminations or tuning may be altered to increase reflection to increase interference rejection. Further the OL, AOL and CL may be tuned at an antenna port termination to reduce output power to meet SAR body exposure limitations. A unified RF front end may us a tunable capacitor integrated circuit to alter the antenna port termination or tune using triggers detected by the controller such as a proximity sensor, capacitive sensor, accelerometer, gyroscope or other motion or orientation sensors detecting a user proximate to one or more antenna systems concurrently operating. These proximity or motion/orientation sensors may be used to provide feedback to conduct the advanced open loop (AOL) tuning operations. A power detection circuit detecting power at a modem front end for an antenna system may detect reflected power and optimize the antenna port termination or tuning according to detected potential sources of interference or needed power reduction. For example, power driving for transmission may be shifted as between concurrently operating antenna systems by the unified RF front end depending on a trigger input arising indicating a need to reduce or increase power to any antenna system. For example, if a user body part is detected proximate to one or more antenna systems, those systems may have transmission power reduced. In another example embodiment, if wireless link aggregation is operating among several parallel wireless links utilizing several antenna systems, reduction in power of an antenna for one of the aggregated wireless links may not have substantial effect on bandwidth relative to the improved operation of wireless links operating concurrently that may experience interference or otherwise reduce wireless link function.

Figure 4:
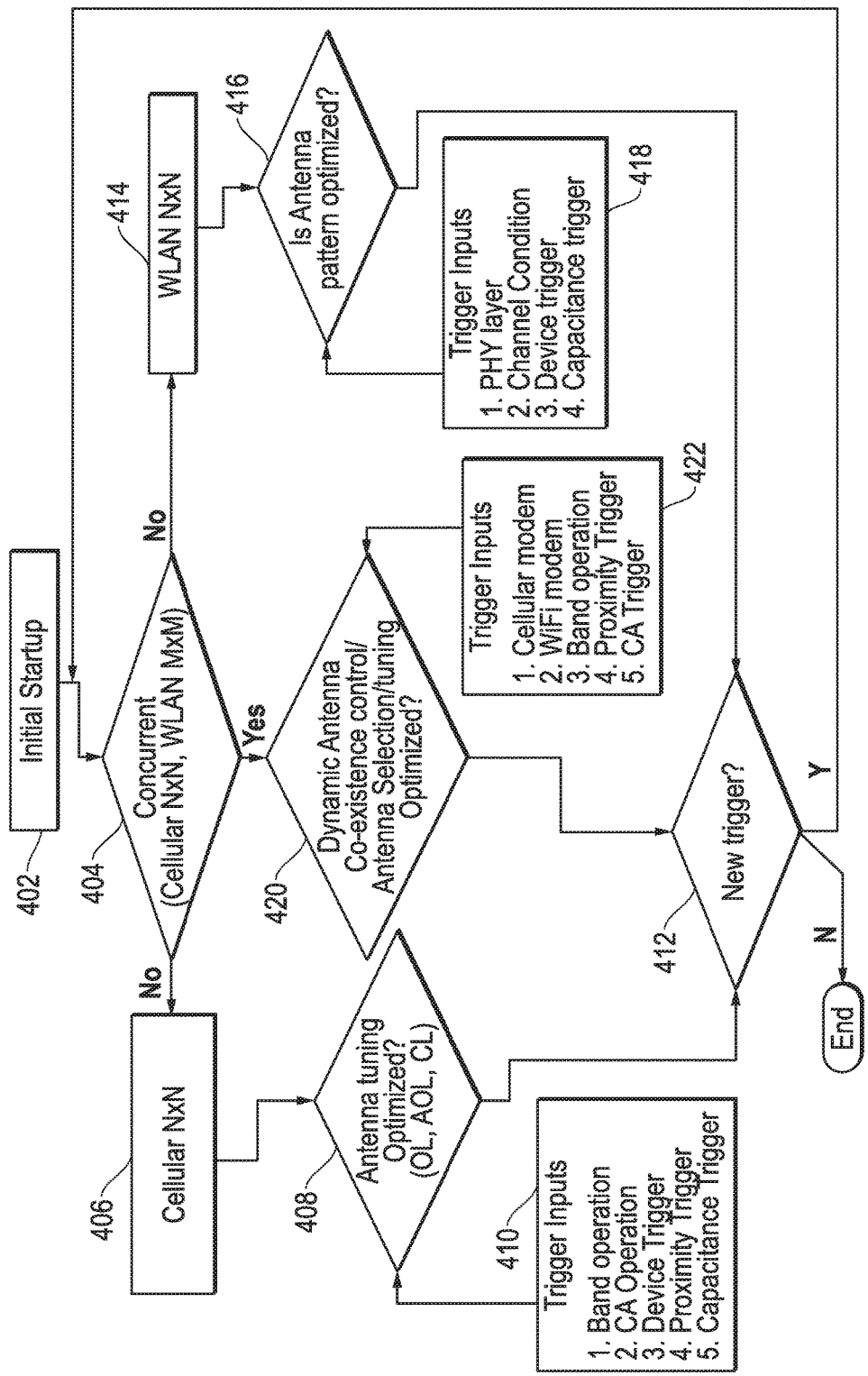
FIG. 4 is a flow diagram illustrating a method of operating a unified front end module with several antenna systems and potential triggers to accommodate simultaneous operation according to an embodiment of the present disclosure.

FIG. 4 illustrates a method for determining antenna adjustments or modification to optimize operation for a plurality of concurrently operating wireless links via unified RF front end according to an embodiment. In this example embodiment, one or more wireless links may be available to a user mobile information handling system as described above. In a further embodiment, a unified RF front end may be used with several models of information handling systems to provide for concurrently use two or more wireless links. The unified RF front end may operate an antenna optimization system with access to antenna adjustment policy having antenna control parameters responsive to trigger inputs that are tailored to the type of information handling system which is operating the unified RF front end. Location of the plurality of antenna systems for use with the unified RF front end on various models of information handling system will have a variety of impacts. Mobile information handling system models have antenna systems located differently, but a unified RF front end may be used with any mobile information handling system in some embodiments. The antenna adjustment policies may be customized to each mobile information handling system type or model. Thus, there is no need for custom RF front end integrated circuitry for each mobile information handling system model. Antenna adjustment policy may be customized instead as needed.

The wireless links may operate on shared radiofrequency communication bands or on radiofrequency communication bands that cause cross antenna interference or other issues. For example, a mobile information handling system may utilize WLAN antennas and unlicensed small cell WWAN antennas, some of which may utilize shared communication bands. Also available may be one more licensed options via carrier WWAN wireless links on licensed communication bands through subscriber or other access. In other aspects, the mobile information handling system communicating concurrently on a plurality of wireless links may utilize carrier aggregation to operate on several parallel wireless links within the same RAT protocol or across different RAT protocols via plural antennas.

The method of FIG. 4 may be executed via code instructions for an antenna optimization system on one or more processors or controllers such as a RF front end controller or other portions of a wireless adapter in an information handling system. It is understood that each of the following steps may be performed by the antenna optimization system at the mobile information handling system, or some portion may be performed at a remote location in whole or in part, or some combination of the same.

At 402, the mobile information handling system with a unified RF front end may be initialized upon start up. The antenna optimization system of the unified RF front end may detect one or more active wireless links operating on a plurality of antennas. The concurrent active wireless links may be WLAN or WWAN antennas operating on the information handling system. Further, each of the cellular WWAN or WLAN radio access technologies may have a MIMO interface involving several plural streams of data on plural wireless links. Those plural wireless links may use one or more antenna systems on the mobile information handling system.

Proceeding to 404, the unified RF front end detects whether multiple RATs are active or if wireless connectivity is sought on multiple RATs. For example, if the WWAN and WLAN module of the wireless interface adapter(s) are proceeding to establish one or more wireless links for each RAT, then flow proceeds to 420. At 420, if concurrent RAT antenna systems will be utilized across WWAN and WLAN, the antenna optimization system may monitor for trigger inputs from sensors in the information handling system including proximity and capacitance detector trigger inputs as well as orientation trigger inputs and other sensors in some embodiments at 422. Further, the antenna optimization system may also monitor activity of the WLAN and WWAN antenna systems (modems) including which radiofrequency bands are being utilized as additional trigger inputs at 422 received via the wireless interface adapter such as from components of the unified RF front end. Additional trigger inputs at the RF front end will be detection of wireless link aggregation such as carrier aggregation (CA) for WWAN. For example, wireless link aggregation such as MIMO activity in either of the WLAN or WWAN RATs and identification of which antenna systems are being utilized for the aggregation activity by the concurrently operating wireless links at 422 may serve as trigger inputs.

In response to the input triggers 422, if any are received, the antenna optimization system will select which antennas may be concurrently operating and be at risk of interference via antenna adjustment policy. As described, antenna adjustment policy may include one or more antenna element control parameter tables such as the example shown above in Table 1 in example embodiments. Then the antenna optimization system on the RF front end at 420 will implement coexistence control parameters for one or more of the identified antennas. In some instances, the antenna optimization system may determine that the active, concurrent antenna systems do not need any adjustment and are already operating in an optimized fashion in that substantial interference is not anticipated. The coexistence control parameters will be implemented, if needed, in accordance with the antenna adjustment policy at 420. The antenna adjustment policy may include one or more antenna element control parameter tables for each antenna system determined in need of modification. In some aspects, only one antenna may be modified, for example, between two antenna systems determined to be at risk of interference or other performance issue during concurrent operation. Such a modification of one of the antennas may be sufficient to avoid the interference during concurrent operation. For example, if one antenna system is part of a greater set of MIMO antennas, reduction in activity or adjustments to the antenna operation may be less impactful since several other MIMO links may still provide sufficient bandwidth. In other aspect, all antennas or any subset of antennas deemed at risk of interference with one or more other concurrently active antenna systems may be altered or modified in operation according to embodiments described herein.

The antenna adjustment policy may determine at 420 which, if any, of the antenna systems in either WWAN or WLAN may be modified in operation and which type of modifications are implemented according to the responses to the matrix of trigger inputs. In one example embodiment, modifications that may be implemented as coexistence control may include enhance band-pass notch filtering, which may have some noise tradeoffs but will isolate a band from nearby operating bands such as adjacent bands on another active antenna system nearby.

In another example embodiment of a coexistence control, impedance versus capacitance of an antenna system may be adjusted. Adjustment of the capacitance or impedance to alter the ratio may shift the antenna's directivity in that radiofrequency radiation may be directed to occur at a greater proportion on the antenna in one case or at a greater level on the antenna system board and chassis of the information handling system which may participate in radio frequency transmission and reception. For example, increased impedance relative to antenna capacitance may shift the directivity of the signal more to the antenna in some embodiments while the reverse may shift the signal radiation more to the chassis and board for the antenna system. This adjustment may accomplish providing greater separation from the competing antenna system or systems that may create interference on the mobile information handling system.

In yet another example embodiment of a coexistence control, selection of open circuit, advanced open circuit, or a closed loop may be implemented or activated by the unified RF front end at 420 is directed by antenna adjustment policy in response to the trigger inputs. Referring to AOL (Advance open loop using feedback) or CL (Closed loop using power detect) tuning, in an antenna co-existence scenario, either antenna port termination or tuning could be altered to improve rejection or enhance pattern diversity or to increase reflection to increase rejection and decrease output power to meet SAR exposure limits. A unified RF front end module may use a tunable capacitor integrated circuit to alter the antenna port termination or tuning based on the the device triggers detected such as with a proximity sensor, capacitance sensor, accelerometer, gyrometer, other orientation or motion sensors. For example, the unified RF front end may conduct advanced open loop tuning or may use a tunable capacitor integrated circuit, with power detect circuit at the modem front end to detect reflected power and optimize antenna port termination or tuning accordingly.

Additional coexistence control measures may be utilized as well. Any or all of the coexistence control options described may be implemented in accordance with the antenna adjustment policy as described. Once the adjustments are implemented or it is determined no adjustments are necessary, flow proceeds to 412 where the antenna optimization system will monitor for changes in the input triggers or monitor for new input triggers via the unified RF front end. If a change is detected, flow may return to 404. If not the process may end, however ongoing monitoring for changed or new input triggers may be conducted until the mobile information handling system is powered down.

Returning to 404, if multiple RATs within both WWAN and WLAN are not determined to be concurrently operating, the antenna operation system will further determine if one or more WWAN wireless links are concurrently operating and flow may proceed to 406. If instead, one or more concurrent wireless links under WLAN RAT protocols are determined to be operating at 404, flow may instead proceed to 414.

When one or more WWAN wireless links are determined to be concurrently operational at 406, then antenna optimization system may monitor for trigger inputs 410 to determine whether the WWAN antenna system or systems are operating in an optimized way to avoid interference or whether coexistence control must be implemented at 408. The coexistence control measures are implemented pursuant to antenna adjustment policy for the information handling system as described and accessed in memory either locally or elsewhere from the unified RF front end. At 408, if concurrent RAT antenna system will be utilized across a plurality of WWAN antenna systems, then the antenna optimization system may monitor for trigger inputs from sensors in the information handling system including proximity and capacitance detector trigger inputs as well as orientation trigger inputs and other sensors in some embodiments at 410. In further embodiments, the antenna optimization system may also monitor activity of the WWAN antenna system including which radiofrequency bands are being utilized and whether there is detection of carrier aggregation (CA) such as MIMO activity in the WWAN RATs as additional trigger inputs at 410. Identification of the active radio frequency bands and which antenna systems are being utilized for aggregation activity of the concurrently operating wireless links is received by the antenna optimization system at the unified RF front end.

In response to the input triggers 410, if any are received, the antenna optimization system will select which antennas may be concurrently operating and be at risk of interference via antenna adjustment policy. As previously described, antenna adjustment policy may include one or more antenna element control parameter tables such as the example shown above in Table 1 in example embodiments. The antenna adjustment policy may be particular to WWAN antennas and activity at 408. Then the antenna optimization system on the RF front end at 408 will implement coexistence control measures for one or more of the identified WWAN antennas.

The coexistence control parameters will be implemented, if needed, in accordance with the antenna adjustment policy at 408. The antenna adjustment policy may include one or more antenna element control parameter tables for each WWAN antenna system determined to require modification for reduction of interference. In some aspects, only one antenna may be modified, or any or all antennas may be altered or modified in operation according to embodiments described herein. Examples of modifications that may be implemented as coexistence control may include harmonic rejection or filtering at antenna ports to mitigate transmission desensing of co-located receiving antennas, antenna aperture tuning at the antenna ports to with varying impedance terminations to alter the directionality of a particular antenna system to mitigate transmission pattern interference causing other noise issues, or decoupling networks activated between co-located antenna ports operating concurrently to enhance rejection of signals or interference between the ports. Each of these coexistence control measures is described in embodiments herein. Any combination of the coexistence controls may be utilized including all three examples or any combination. Further, additional coexistence control measures may be further employed including turning off or turning down power to some antenna systems and using alternative options such as between parallel wireless links from a MIMO set of wireless links with several parallel data streams on wireless connections.

Shown at 408 is a determination of whether an antenna adjustment is needed and if it is, modification by selection between open circuit, advanced open circuit, or a closed loop applied to the antenna coupling pathway by the unified RF front end as directed by antenna adjustment policy and in response to the trigger inputs. Activation of an open circuit in the coupling path may mitigate port to port coupling interference in an example embodiment. Advanced open loop activation may provide for dynamic activation of the open loop circuit based on which antenna systems are currently active.

Once the adjustments are implemented or it is determined no adjustments are necessary at 408 for the WWAN antennas, flow proceeds to 412. At 412, the antenna optimization system will monitor for changes in the input triggers or monitor for new input triggers via the unified RF front end. If a change is detected, flow may return to 404. If not the process may end, however ongoing monitoring may be conducted until the mobile information handling system is powered down.

Returning to 414, when one or more WLAN wireless links are determined to be concurrently operational, then antenna optimization system may monitor for trigger inputs 418 to determine whether the WLAN antenna system or systems are operating in an optimized way to avoid interference or whether coexistence control must be implemented at 416. The coexistence control measures are implemented pursuant to antenna adjustment policy for the information handling system as described and accessed in memory either locally or elsewhere from the unified RF front end. The trigger inputs may be a select group of trigger inputs, such as those relevant to WLAN antenna systems or all trigger inputs may be made available for assessment by the antenna optimization system. At 416, trigger inputs may be received from sensors in the information handling system including proximity and capacitance detector trigger inputs as well as orientation trigger inputs and other sensors in some embodiments at 418. In further embodiments, the antenna optimization system may also monitor activity of the WLAN antenna system including which radiofrequency bands are being utilized. Identification of the active radio frequency bands and which antenna systems are being utilized for aggregation activity of the concurrently operating wireless links is detected by the unified RF front end and utilized by the antenna optimization system.

In response to the input triggers 418, if any are received, the antenna optimization system will select which WLAN antennas may be concurrently operating and be at risk of interference via antenna adjustment policy. As previously described, antenna adjustment policy may include one or more antenna element control parameter tables such as the example shown above in Table 1. Then the antenna optimization system on the RF front end at 416 will implement coexistence control measures for one or more of the identified WLAN antennas if needed, in accordance with the antenna adjustment policy.

The coexistence control measures may alter antenna operation as described in embodiments above and may include impedance antenna control for directionality of particular antenna system, or enhanced band-pass notch filtering for isolation of particular antennas, and port impedance tuning to mitigate port connection coupling between antenna systems. Any combination of the coexistence controls may be utilized including all three examples or any combination. Further, additional coexistence control measures may be further employed including turning off or turning down power to some antenna systems and using alternative options such as with a MIMO set of wireless links with several parallel data streams on wireless connections as described herein.

Shown at 416 is a determination of whether an antenna adjustment is needed and if so, modification by altering antenna impedance relative to antenna capacitance to affect antenna directionality pattern. Alteration of antenna directionality pattern may shift radio frequency radiation more to an antenna or to the chassis depending on the ratio of antenna impedance to capacitance. This may direct radio frequency transmission energy away from other nearby antenna systems or away from chassis portions shared by more than one antenna system. As before, upon implementation of the adjustments or it is determined no adjustments are necessary at 416 for the WLAN antennas, flow proceeds to 412. At 412, the antenna optimization system will continue to monitor for changed or new input triggers. If a change is detected, flow may return to 404. If not the process may end, however ongoing monitoring may be conducted until the mobile information handling system is powered down.

It is understood that the methods and concepts described in the algorithm above for FIG. 4 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 5:
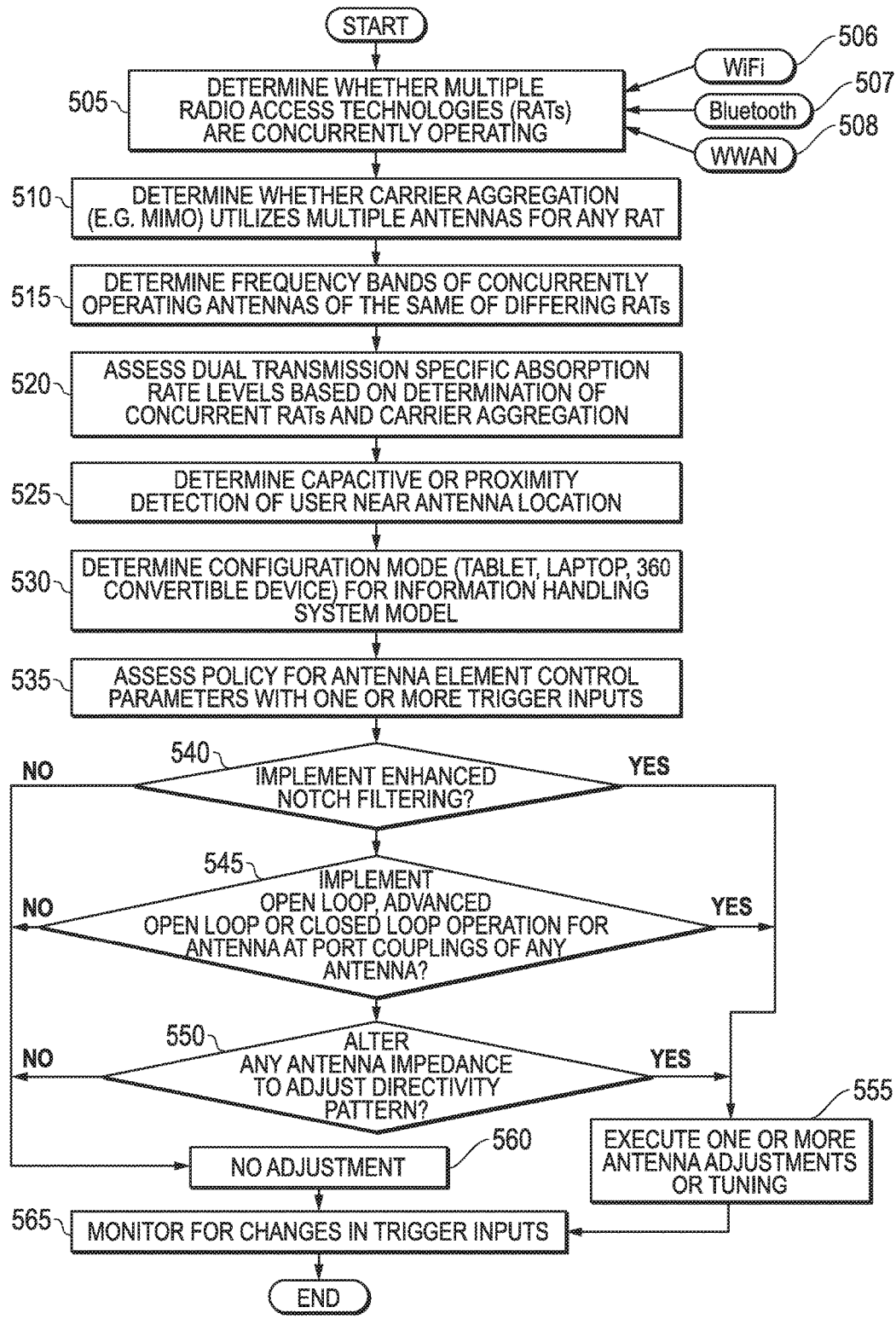
FIG. 5 is a flow diagram illustrating a method of operating a unified front end module with several antenna systems and potential triggers to accommodate simultaneous operation according to another embodiment of the present disclosure.

FIG. 5 illustrates a method for determining antenna adjustments or modification to optimize operation for a plurality of concurrently operating wireless links via unified RF front end according to an embodiment of the present disclosure. At 505, in this example embodiment, one or more wireless links may be available to a user of a mobile information handling system. An antenna optimization system executed as machine readable code, such as firmware, on a RF front end controller or on controller elsewhere in a wireless interface adapter may coordinate operation of a plurality of antenna systems operational in a mobile information handling system. As part of a unified front end, the antenna optimization system may be tailored to apply an antenna adjustment policy in response to trigger inputs for executing various antenna adjustments that is tailored to an indicated model type of mobile information handling system as described above. Additionally, the mobile information handling system may concurrently use two or more wireless links on a shared radiofrequency communication band, separate communication bands, and across a variety of RATs as described in various embodiments of the present disclosure. For example, a mobile information handling system may utilize WLAN and unlicensed small cell WWAN wireless links within a shared, wireless communication band or at various bands which may have effects between wireless links due to harmonics, current coupling, or other factors that may cause interference in the communication on the concurrently operating wireless links. In other aspects, the mobile information handling system may communicate concurrently on a plurality of wireless links to establish parallel data streams for enhanced bandwidth via aggregation techniques such as MIMO. MIMO techniques may be utilized with a single RAT service or across various RAT services depending on configurations.

At 505, the antenna optimization system may detect whether multiple RATs are concurrently operating for an information handling system. For example, the unified RF front end may detect whether a Wi-Fi 506, Bluetooth 507, or cellular 508 antenna system is activated due to activity on respective modules in the wireless interface adapter or adapters. For example, activation of modems thereon or other wireless link activity of a wireless interface adapter may be detected. Activation of a type of modem and which radio frequency communication band is being used may be provided to the antenna optimization system as one trigger inputs.

At 510, the antenna optimization system also receives indication from the WWAN module, the Wi-Fi module, or the Bluetooth module (as relevant) whether any RAT protocol is utilizing wireless link aggregation in an embodiment. In particular, the wireless link aggregation, such as carrier aggregation for LTE WWAN, will be indicated and may include MIMO techniques for intra-band aggregation or inter-band aggregation. Intra-band aggregation may occur in adjacent or near-adjacent channels and be subject to bleed over interference in some instances. Intra-band aggregation may be subject to harmonics or may cause interference with other concurrently wireless links on different RATs. For example, some unlicensed, small cell WWAN options and other optional wireless links may share radiofrequency communication bands under the U-NII communication band at around 5 MHz with Wi-Fi WLAN radio frequency communication bands in the same or similar frequency band. Such technologies may be available under the 4G LTE-LAA standards or equivalents in emerging 5G technology. Aggregation techniques may also be applied within WLAN RATs as well such as via frame aggregation or other techniques under various IEEE 802.11 standards for wireless LAN.

Proceeding to 515, the mobile information handling system may scan radios to determine or confirm which WWAN, WLAN, Bluetooth or other modems are operational and determine which radio frequency communication bands are active. This data, as a trigger input, may indicate the presence of shared band operation or adjacency of radio frequency communication bands for concurrently operating wireless links. It may also provide information relating to the effects such as from harmonics or interfering coupling currents on transmitting surfaces as anticipated due to the design of a model of mobile information handling system and the known locations for multiple antenna systems.

At 520, which antenna systems are operating and at what power levels of the multiple antenna systems may be detected and received as additional trigger inputs for specific absorption rate levels. The number of antenna systems and the power levels at which transmission is occurring may determine or affect how much power may be used to transmit from each of the plurality of antenna systems. Additionally, the specific absorption rate safety limitations depend in part on the type of device such as a laptop, desktop docked device, tablet, or mobile smart phone. Each type may be subject to differing power transmission level limitations due to differing risks of contact with human tissue. Some devices, such as 360 degree convertible devices, may have differing levels depending on whether the device is in a tablet, laptop, or docked laptop configuration in some embodiments. Generally, performance of antenna systems is improved if greater transmission power is permitted or if a receiver or device is moved closer to the antenna system. However, this is limited in part by controls over SAR levels that a user may be exposed to, and in particular close exposure to human tissue of a head, hand, lap or other body part. As dual transmissions are conducted, or as other plural transmissions are conducted, the level of power available to each antenna for transmission is diluted since the overall maximum power may be limited by the SAR regulations. The plural power levels of concurrently operating antenna systems is assessed as a trigger input to the antenna optimization system.

Proceeding to 525, the antenna optimization system may receive additional trigger input data from proximity sensors or capacitive touch sensors on the mobile information handling system, such as via a sensor hub, to indicate presence of a user near one or more antenna systems located on the mobile information handling system. The proximity or capacitive sensors may even indicate location of a user's body part relative to the one or more antenna systems.

Operation of the proximity of capacitive sensors is described further in embodiments herein.

At 530, yet another trigger input may be received, such as via a sensor hub, to indicate orientation of an information handling system. Orientation of a mobile information handling systems will affect several aspects of the concurrent operation of a plurality of antenna systems. The relative physical proximity or direction of transmissions by antenna systems with respect to one another may be altered depending on the orientation of the mobile information handling system. For example, with a laptop, 360 degree convertible device, or a tablet with two display housings, separate sides may be hinged with respect to one another or the sides may be detachable. Since each side may have one or more antenna systems or transmission surfaces including a chassis, casing materials, or other conductive components, orientation of the sides relative to one another may impact direction and transmission from among multiple antenna systems. Orientation of a mobile information handling system, such as overall orientation or orientation of the two more parts relative to one another, may also impact the capacity of the antenna systems to radiate radio frequency energy to a user and impact SAR limitations as well.

Several configuration modes may be established from the determined orientation of the mobile information handling system or orientation of hinged sides of an information handling system relative to one another. In one embodiment, configuration mode may be determined. In another embodiment, detection of whether two sides or a portion of a mobile information handling system is detached or may be determined from detection of a docking of a mobile information handling system at a docking station may be sensed as a trigger input. Several detectors, including docking detectors or detachment detectors may be utilized in accordance with the embodiments herein to establish orientation or usage mode which will affect how the trigger inputs are assessed for modification of concurrently operating antenna systems. Such data may be received by the unified RF front end and the antenna optimization system.

At 535, the antenna optimization system may access antenna adjustment policy for the mobile information handling system type in which the unified RF front end has been installed. Several antenna element control parameters are provided to modify or alter antenna operation to avoid or reduce interference or other degradation of antenna performance as described in embodiments herein. The antenna adjustment policy may provide antenna element control parameters with one or more coexistence controls to be applied to any of one or more antenna systems operational on the mobile information handling system. In various embodiments, the antenna adjustment policy may be specific to type of mobile information handling system such as a laptop, 360 degree convertible laptop, dual display housing tablet, tablet, mobile smart phone or other mobile information handling system types such as wearable devices as a category. In a further embodiment, antenna adjustment policy may provide antenna element control parameters for one or more coexistence controls particular to specific models of mobile information handling systems of any category or any type. Tailored coexistence controls may be determined in antenna adjustment policy based on the plural antenna placements, the function and radio types available, the possible orientations, and other factors for the specified model of mobile information handling system in particular embodiments.

Upon receiving one or more trigger inputs and assessing the antenna adjustment policy for antenna element control parameters, the flow may proceed to 540, 545, and 550 for implementation of one or more coexistence controls by the unified RF front end to tune or alter operation of one or more antenna systems. The antenna operation modifications may optimize function by reducing potential causes for interference or wireless performance degradation dynamically. In a further aspect, the unified RF front end may also account for the limits of the SAR exposure regulations dynamically while accommodating the most power permissible to enhance performance dynamically during concurrent operation of a plurality of antenna systems.

In various example embodiments described in the present disclosure, coexistence controls may include implementation of enhanced notch filtering for one or more antenna systems 540, implementation of open loop or closed loop or advanced open loop circuitry on port couplings for antenna systems 545, or altering antenna impedance or capacitance to shift directivity of transmission pattern 550.

Based on the assessed antenna adjustment policy at 535, the unified RF front end may be directed by the antenna optimization system to execute any combination of available coexistence controls. The antenna optimization policy will determine at 540, 545, and 550 which of the available coexistence controls are to be implemented for which of the plurality of antenna systems. In the embodiment of FIG. 5, the operation of the antenna optimization system is shown to determine for one antenna system which, if any, of the coexistence control measures to execute via the unified RF front end. It is understood that a similar process may be undergone by the antenna optimization system for any active antenna systems. For example, at 540 the antenna optimization policy determined if enhanced notch filtering will be implemented to isolate wireless antenna systems from adjacent or nearby radio frequency operation in channels of a shared radio frequency communication band or in nearby radio frequency bands concurrently operating. Similarly, enhanced notch filtering may also be used to isolate any effects from harmonic interference discovered due to concurrent operation with other antenna systems in the information handling system model. If enhanced notch filtering is to be deployed at 540 flow may proceed to 555 to execute the enhanced notch filtering by the unified antenna front end for the antenna system.

Additionally, flow may proceed to 545 where the antenna optimization system may determine if port coupling path circuits may be operated in an open loop, advanced open loop or closed loop configuration to mitigate port-to-port coupling of antennas and interference or performance degradation resulting from the same. If a change in the coupling path configuration of the antenna system is required by the antenna adjustment policy for this antenna system, flow will proceed to 555 to execute this change by the unified RF front end. An affirmative indication of an antenna adjustment may be made at either 540 or 545 or at both such that either coexistence control, both coexistence controls, or neither coexistence control may be implemented by the unified RF front end of the present disclosure.

Flow will proceed to 550 as well where the antenna optimization system may determine if the antenna adjustment policy for the mobile information handling systems model requires altering antenna impedance or capacitance to shift antenna radiation between antenna system components. For example, altering antenna impedance relative to antenna capacitance may alter directivity pattern of the antenna system by shifting the transmission pattern between the antenna and chassis for directivity purposes in accordance with various embodiments herein. If antenna impedance or capacitance is to be altered, flow will also proceed to 555 to execute this modification by the unified RF front end for this antenna system. Again any affirmative indication of an antenna adjustment may be made at either 540, 545, 550 or at all or any combination such that one or more coexistence controls may be implemented by the unified RF front end of the present disclosure at 555. A similar process may be conducted by the antenna optimization system for other antenna systems concurrently operating on the model of mobile information handling system. Flow will proceed to 565 where the antenna optimization system operates dynamically and monitors for changes to trigger inputs or for new trigger inputs that impact the concurrently operating antenna systems. If a change is detected, then flow may repeat back to step 505 to implement a change, if any, in the coexistence controls by the unified RF front end. Although the process may continuously monitor while the mobile information handling system is powered on, the flow may end with ongoing monitoring or a determination that no plurality of wireless links is active.

If no implementation of an enhanced notch filter is determined at 540, no change in the coupling path of the antenna system is required by the antenna adjustment policy for this antenna system at 545, and no tuning of antenna impedance or capacitance is to be executed, then flow will proceed to 560 where the unified RF front end does not alter or modify the operation of this antenna system.

Upon determination for the antenna system assessed under 540, 545 and 550 that no coexistence control measures will be implemented, flow will proceed to 565. At 565, the antenna optimization system operates dynamically and monitors for changes to trigger inputs or for new trigger inputs that impact the concurrently operating antenna systems. If a change is detected, then flow may repeat back to step 505 as before to implement a change, if any, in the coexistence controls. The process may continuously monitor while the mobile information handling system is power on, but at this point the described flow may end.

It is understood that the methods and concepts described in the algorithm above for FIG. 5 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 4 and 5 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A wireless interface adapter for an information handling system comprising:

a unified antenna front end having a controller in the wireless interface adapter operatively coupled to a plurality antenna systems for connection to a plurality of concurrently operating wireless links;

the controller executing code instructions for an antenna optimization system for detecting one or more active wireless links operating via the plurality of antenna systems and for controlling tuning of the plurality of antenna systems;

a sensor hub monitoring status of a plurality of usage modes including whether a plurality of radio access technologies (RATs) are active, whether a shared communication frequency band is implemented, whether carrier aggregation is active, and whether user proximity has been detected requiring SAR adjustment;
the sensor hub reporting the status of the plurality of usage modes as trigger inputs to the controller and the controller determining, via the antenna optimization system, an operating condition to determine whether an antenna adjustment is required among the plurality of antenna systems; and
the controller implementing an impedance adjustment of at least one of the plurality of wireless antenna systems to avoid interference between concurrently operating wireless links or reduction of one or more transmission power levels due to the determined operating condition.

2. The wireless adapter front end of claim 1 wherein the controller implements the impedance adjustment of at least one of the plurality of wireless antenna systems for directivity by altering capacitance or impedance to adjust coupling RF currents from the antenna to the information handling system chassis.

3. The wireless adapter front end of claim 1, further comprising:
the controller implements notch filtering of at least one of the plurality of wireless antenna systems in response to the received trigger input.

4. The wireless adapter front end of claim 1, further comprising:
the controller accesses an antenna element control parameter database for the information handling system model to determine an antenna adjustment response to one or more trigger inputs.

5. The wireless adapter front end of claim 1, further comprising:
the trigger input is an indication of multiple input, multiple output (MIMO) operation of a RAT across the plurality of concurrently active wireless links.

6. The wireless adapter front end of claim 1, further comprising:
the trigger input is an indication from a proximity sensor or a capacitive sensor of a condition requiring control over transmission levels to maintain specific absorption rate (SAR) limits.

7. The wireless adapter front end of claim 1, further comprising:
the trigger input is an indication of a user configuration mode of the information handling system affecting orientation of the plurality of wireless antenna systems.

8. A computer implemented method comprising:
detecting, via a controller for controlling operation of a plurality of plurality of antenna systems of an information handling system, a plurality of concurrently operating wireless links;
executing code instructions of an antenna optimization system operating on the controller in a unified antenna front end of a wireless interface adapter
to determine an operating condition of the plurality of antenna systems operatively coupled to the controller based on receiving a plurality of trigger inputs including indications of the status of whether a shared communication frequency band is used, whether a carrier aggregation operation is active, whether user proximity is detected requiring SAR adjustment, and whether a plurality of radio access technologies (RATs) are operating concurrently; and
the controller determining a required antenna adjustment to any of the operatively coupled plurality of antenna systems in response to the trigger input status and implementing an antenna adjustment in response, wherein antenna adjustment may include impedance adjustment of at least one of the plurality of wireless antenna systems or implementing notch filtering of at least one of the plurality of wireless antenna systems to avoid interference between concurrently operating wireless links.

9. The method of claim 8, further comprising:
accessing in memory an antenna element control parameter database for the information handling system model to determine an antenna adjustment response to one or more trigger inputs.

10. The method of claim 8, wherein the plurality of concurrently operating wireless links on the information handling system includes at least one Wi-Fi wireless link.

11. The method of claim 8, further comprising:
the trigger input is an indication of a shared communication frequency band operation of the plurality of wireless links.

12. The method of claim 8, further comprising:
the trigger input is an indication of multiple input, multiple output (MIMO) operation of a RAT across the plurality of wireless links.

13. The method of claim 8, further comprising:
the trigger input is an indication of a user configuration mode of the information handling system affecting orientation of the plurality of wireless antenna systems.

14. The method of claim 8, wherein the controller implements the impedance adjustment of at least one of the plurality of wireless antenna systems and implements notch filtering at a port coupling of at least one of the plurality of wireless antenna systems to avoid interference between concurrently operating wireless links.

15. The method of claim 8, wherein the controller implements the impedance adjustment of at least one of the plurality of wireless antenna systems for directivity by altering capacitance or impedance to adjust coupling RF currents from the antenna to the information handling system chassis.

16. A wireless interface adapter for an information handling system comprising:
a unified antenna front end having a controller for controlling a plurality of operatively coupled antenna systems for connection to a plurality of concurrently operating wireless links;
a sensor hub monitoring status of a plurality of usage modes including whether a plurality of radio access technologies (RATs) are active, whether a shared communication frequency band is implemented, whether carrier aggregation is active, whether user proximity has been detected requiring SAR adjustment, and whether a physical configuration of the information handling system in tablet or laptop mode;
the sensor hub reporting the status of the plurality of usage modes to the controller as trigger inputs;
the controller executing code instructions of an antenna optimization system for determining an operating condition based on reported status of the plurality of usage modes to determine if one of the controlled antenna systems requires adjustment, wherein
the controller implements a notch filtering adjustment of at least one of the plurality of wireless antenna systems to avoid interference between concurrently operating wireless links.

17. The wireless adapter front end of claim 16 wherein the controller implementing notch filtering of at least one of the plurality of wireless antenna systems includes isolating the at least one of the plurality of wireless antenna systems by activating enhanced band-pass filtering.

18. The wireless adapter front end of claim 16, wherein the controller implementing notch filtering of at least one of the plurality of wireless antenna systems includes activating an open circuit coupling path at a port coupling of the at least one of the plurality of wireless antenna systems to avoid RF current cross over at the antenna port.

19. The wireless adapter front end of claim 16, further comprising:
   the controller implements an impedance adjustment of at least one of the plurality of wireless antenna systems for directivity by altering capacitance or impedance to adjust effective aperture for the antenna to the information handling system chassis in response to the received trigger input.

20. The wireless adapter front end of claim 16, further comprising:
   the trigger input is the indication of the carrier aggregation operation that is a multiple input, multiple output (MIMO) operation across the plurality of concurrently operating wireless links.

\* \* \* \* \*